(12) United States Patent
Majer Doglioni

(10) Patent No.: US 7,100,496 B2
(45) Date of Patent: Sep. 5, 2006

(54) UNIT FOR PREPARING BEVERAGES FROM SOLUBLE PRODUCTS

(75) Inventor: Luca Majer Doglioni, Milan (IT)

(73) Assignee: Tuttoespresso S.p.A., Caronno Pertusella (IT)

(*) Notice: Subject to any disclaimer, the term of this patent is extended or adjusted under 35 U.S.C. 154(b) by 203 days.

(21) Appl. No.: 10/472,437

(22) PCT Filed: Mar. 23, 2001

(86) PCT No.: PCT/IT01/00147

§ 371 (c)(1),
(2), (4) Date: Nov. 20, 2003

(87) PCT Pub. No.: WO02/076270

PCT Pub. Date: Oct. 3, 2002

(65) Prior Publication Data
US 2004/0083898 A1   May 6, 2004

(51) Int. Cl.
*A31J 31/06* (2006.01)

(52) U.S. Cl. .................. 99/295; 99/302 R; 426/433

(58) Field of Classification Search .................. 99/295, 99/302 R; 426/112, 115, 77, 82, 433
See application file for complete search history.

(56) References Cited

U.S. PATENT DOCUMENTS

| | | | | |
|---|---|---|---|---|
| 5,242,702 A | * | 9/1993 | Fond | 426/433 |
| 5,398,596 A | * | 3/1995 | Fond | 99/295 |
| 5,656,316 A | * | 8/1997 | Fond et al. | 426/433 |
| 5,948,455 A | * | 9/1999 | Schaeffer et al. | 426/77 |
| 6,832,542 B1 | * | 12/2004 | Hu et al. | 99/302 R |

FOREIGN PATENT DOCUMENTS

| | | |
|---|---|---|
| CH | 688 686 A | 1/1998 |
| DE | 74 30 910 U | 4/1976 |

* cited by examiner

*Primary Examiner*—Reginald L. Alexander
(74) *Attorney, Agent, or Firm*—Nixon & Vanderhye P.C.

(57) ABSTRACT

The description concerns a unit for the preparation of a drink from a soluble mix contained in a disposable capsule, of the type comprising a collecting device with housing designed to contain the capsule, in which at least one choking arrangement is provided to ensure laminar flow of the drink as it comes out of the capsule.

18 Claims, 3 Drawing Sheets

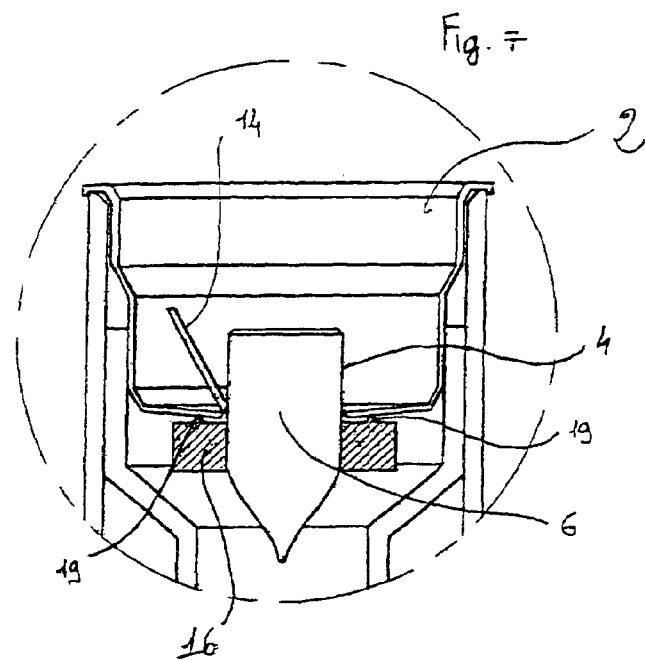
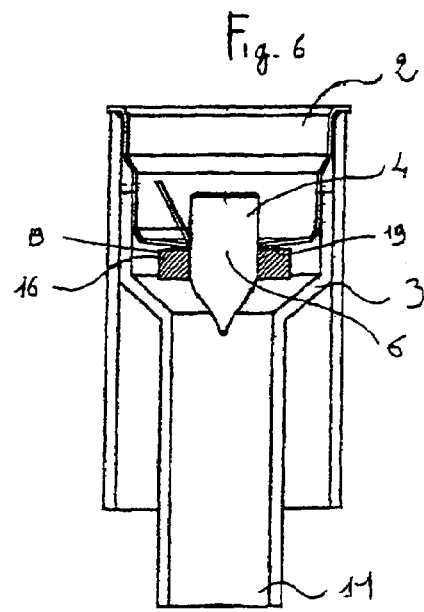
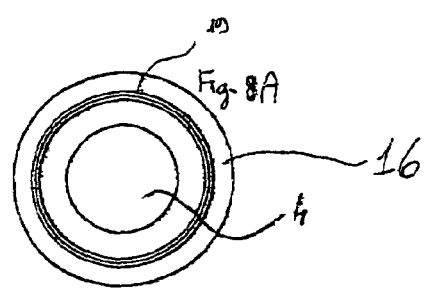
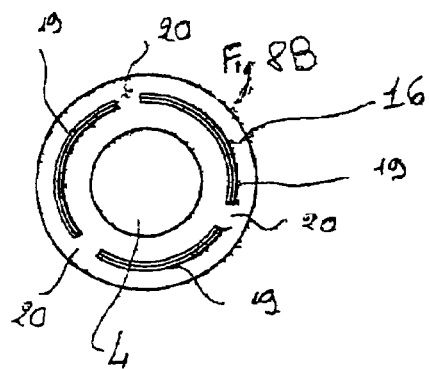

UNIT FOR PREPARING BEVERAGES FROM SOLUBLE PRODUCTS

This application is the US national phase of international application PCT/IT01/00147 filed 23 Mar. 2001, which designated the US.

TECHNICAL FIELD OF THE INVENTION

The present invention concerns the preparation of beverages and in particular a unit for the preparation of beverages from soluble products contained in disposable cartridges.

BACKGROUND ART

In known types of machines, the units for preparation and delivery of the beverage generally comprise a collecting device with a seat for receiving the disposable cartridge. Once the cartridge has been inserted in the collecting device seat, pressurised water is introduced into the cartridge, via an inlet port, to form a beverage consisting of a solution or a dispersion in water of the soluble product which is delivered via an outlet port on the cartridge.

As the disposable cartridges are originally sealed to prevent outflow of the soluble product during handling, the collecting device is generally provided with a piercing member which opens one or more outlet ports on a wall of the cartridge, for example on the bottom of it, along a number of pre-formed breaking lines.

In known types of machines, the particular shape of the cartridge promotes the formation of a turbulent flow inside the cartridge, thus permitting mixing of the soluble product in the water. The beverage thus formed is released via the outlet ports defined by the above-mentioned breaking lines and/or by outlet ports in the piercing member.

A unit for the preparation of beverages of this type has a number of disadvantages. It has been observed that the turbulence mixing which takes place in the cartridge is not equally efficient and complete for different granulometries of soluble products, for example soluble products for coffee, cappuccino, tea and the like.

In fact, the outlet ports that form on the bottom of the cartridge due to the piercing are too large and can cause the delivery of non-dissolved product and clots of it from the cartridge, for example at the beginning of delivery.

The outflow of particles of non-dissolved soluble product not only lowers the quality of the beverage produced but can cause partial or total obstruction of the beverage outlet ports due to deposit of said particles on the walls of the outlet ports or channels downstream of the outlet ports with respect to the dispersion flow.

DISCLOSURE OF THE INVENTION

The object of the present invention is to propose a unit for the preparation of beverages that solves the problems of the known technique.

In the context of this object, one object of the present invention is to propose a unit for the preparation of beverages which is particularly effective in dissolving the soluble product regardless of its granulometry.

Another object of the present invention is to propose a unit for the preparation of beverages able to prevent outflow from the cartridge of particles of non-dissolved product.

A further object of the present invention is to provide a unit for the preparation of beverages that combines an improved delivery system with a cartridge opening system.

These objects are achieved by the present invention which concerns a unit for the preparation of a beverage from a soluble product, of the type comprising a collecting device with a seat designed to receive a disposable cartridge containing the soluble product, the cartridge comprising at least one inlet port for a suspension fluid introduced into the cartridge and at least one outlet port for delivery of the beverage consisting of the soluble product and the suspension fluid, characterised in that it comprises at least one throttling arrangement to give the beverage a laminar flow as it is released from the cartridge.

This allows efficient mixing of the soluble product with the water during delivery of the beverage. In fact, along the throttling arrangement, i.e. a particularly narrow passage for the beverage as it flows out, the particles of soluble product are forced into solution and any clots are fragmented before delivery, thus releasing further particles of soluble product which will dissolve more easily.

A throttling arrangement according to a possible embodiment of the invention can be provided between the piercing member in the collecting device and the outlet port of the beverage from the cartridge, providing in particular a piercing member with a portion engaging the cartridge having shape and dimensions substantially equal to those of the cartridge outlet port.

The engaging portion of the piercing member can have, for example, a substantially cylindrical shape with circular section and the breaking line in the cartridge can also have a substantially circular shape.

Preferably, the engaging portion of the piercing member will have a diameter substantially equal to or slightly larger than that of the outlet port in order to provide an interference fit between the cartridge outlet port and the piercing member.

This advantageously limits as far as possible the width of the passage available for the soluble product and the water used for mixing it, making even more effective the formation of a laminar flow for the beverage as it flows out of the cartridge. In addition, as the interference between cartridge outlet port and piercing member increases, the operating pressure inside the cartridge increases. Said pressure increase allows the beverage to emulsify more uniformly, creating a more consistent and attractive cream on the surface.

According to another possible embodiment of the invention, the throttling arrangement is provided between a supporting element of the cartridge and a wall of the same. The throttling arrangement can thus be provided by means of a rib protruding from the supporting surface of the supporting element which abuts against the wall of the cartridge comprising the outlet port and which surrounds the outlet port. Alternatively the protruding rib can be provided on the cartridge so that it abuts against the supporting surface of the ring-shaped element.

According to a further possible embodiment of the invention, the throttling arrangement can be created between the supporting surface of the supporting element and the part of the cartridge wall abutting on the same.

These further embodiments of the throttling arrangement can thus be adopted as an alternative to or in combination with the throttling arrangement created between the outlet port and the piercing member.

The invention furthermore concerns a cartridge for use in a unit for the preparation of beverages like the one described here, as well as a method for preparing beverages in which the beverage coming out of the cartridge is given a laminar flow.

BRIEF DESCRIPTION OF THE DRAWINGS

Further characteristics and advantages of the present invention will become clearer from the following description, provided as a non-limiting illustration with reference to the attached schematic drawings in which:

FIG. 6 is a vertical section view of a unit for the preparation of beverages according to another embodiment of the present invention;

FIG. 7 is an enlarged view of a detail of the embodiment of FIG. 6; and

FIGS. 8A and 8B are top plan views of two alternative embodiments of an element of the unit for the preparation of beverages of FIG. 6.

MODES FOR CARRYING OUT THE INVENTION

Figure 1:
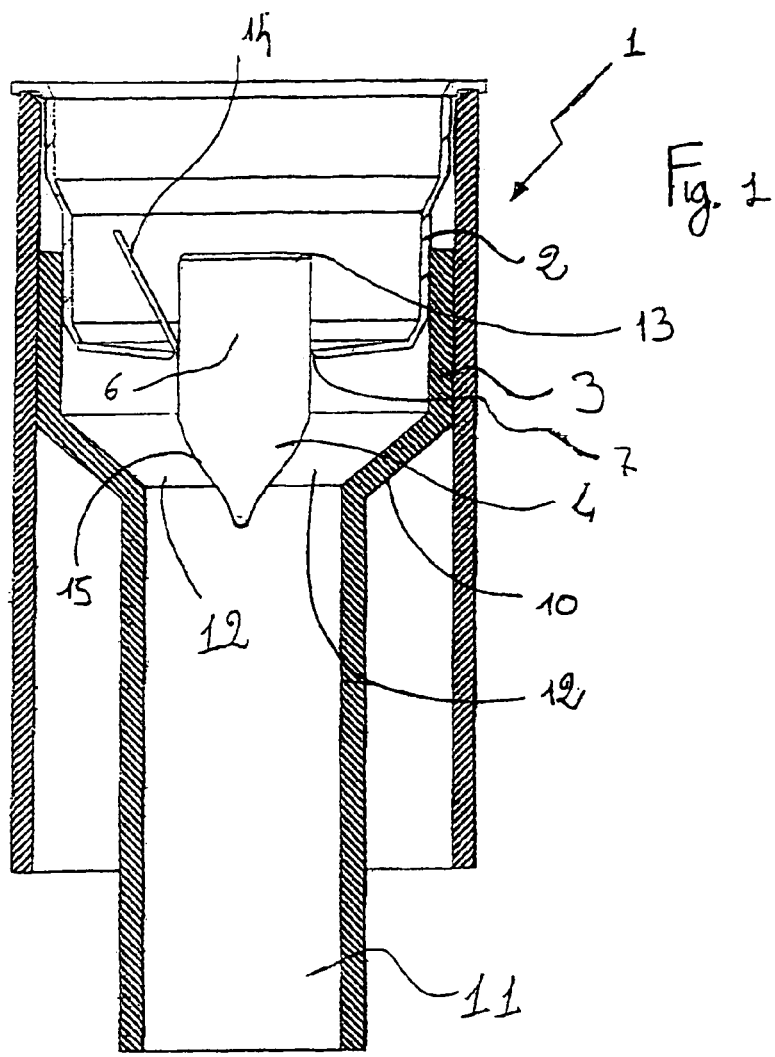
FIG. 1 is a vertical section view of a unit for the preparation of beverages according to a possible embodiment of the present invention.

FIG. 1 shows a possible embodiment of a unit for the preparation of beverages according to the present invention.

Unit 1 for the preparation of beverages comprises a collecting device 3 provided with a seat designed to contain a disposable cartridge 2. The latter can be made, for example, of plastic such as polypropylene for alimentary use able to withstand the operating temperatures of a machine for the preparation of beverages in which a preparation unit according to the present invention is used.

Inside the collecting device 3 is a piercing member 4 comprising a portion 6 which engages with an outlet port of the cartridge 2.

Figure 2:
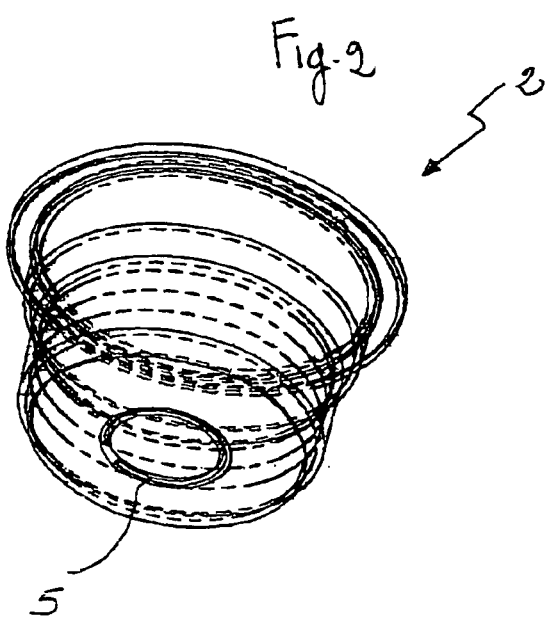
FIG. 2 is a perspective view of a cartridge for use in a unit for the preparation of beverages according to the present invention.

In the embodiment illustrated herein, the piercing member 4 is a substantially cylindrical-shaped member with circular section which pierces the bottom of the cartridge 2 in a weakened area defined by a breaking line which is also circular. The breaking line consists of a notch 5 (FIG. 2) which defines a portion 14 of the bottom of the cartridge 2.

The piercing member 4 penetrates the cartridge 2 raising the portion 14 of the bottom of the cartridge 2 defined by the notch 5, forming a circular outlet port which matches with the engaging portion 6 of the piercing member 4.

The piercing member 4, at least in the engaging portion 6, has a diameter substantially equal to or slightly smaller than the diameter of the cartridge outlet port, thus creating a throttling arrangement by means of interference fit between cartridge 2 and engaging portion 6. This allows the beverage coming out of the cartridge to be given a substantially laminar flow.

In the embodiment shown in FIG. 1, the piercing member 4 is connected to the internal walls of the collecting device by means of connection fins 12, with an upper end 13 protruding from the fins 12 to resist insertion of the cartridge 2 in the collecting device 3 and allow raising of the edge 14 with consequent formation of an outlet port.

In other words, when the cartridge 2 is inserted in the seat of the collecting device 3, the upper end 13 of the piercing member 4 exerts a pressure on the bottom portion of the cartridge 2 defined by the circular breaking line 5, raising the bottom edge 14 of the cartridge 2 and permitting penetration of the piercing member 4 into the cartridge 2 until the outlet port defined in the cartridge reaches the engaging portion 6 of the piercing member 4.

The bottom end 15 of the piercing member has a tapered profile which facilitates outflow of the solution towards the outlet channel 11 of the collecting device.

The piercing member 4 can be produced in one single piece with the connection fins 12 and with the collecting device 3, or alternatively can be fixed in position by means of known methods.

The end portion 11 of the collecting device 3 is a cylindrical portion with circular internal section which connects the collecting device 3 to the beverage delivery channel (not shown).

Once inserted in the collecting device 3, the cartridge 2 is positioned under a delivery plate (not shown) which during the beverage preparation process is lowered onto the cartridge 2, creates a sealed connection and lets pressurised water into the cartridge via its inlet port (not shown).

The pressure of the water let into the cartridge 2, above atmospheric pressure, forces the beverage to flow out of the outlet port at the connection area with the engaging portion 6 of the piercing member 4, thus generating a laminar flow which provides an excellent quality product.

In fact, as the operating pressure increases inside the cartridge, a more uniform emulsion is obtained and a more consistent attractive foam forms on the surface.

The narrow outlet port also prevents the outflow of larger particles or clots of soluble product not yet dissolved. These particles or clots, due to their size, are fragmented and easily dissolved during their passage through the narrow outlet port.

Figure 3:
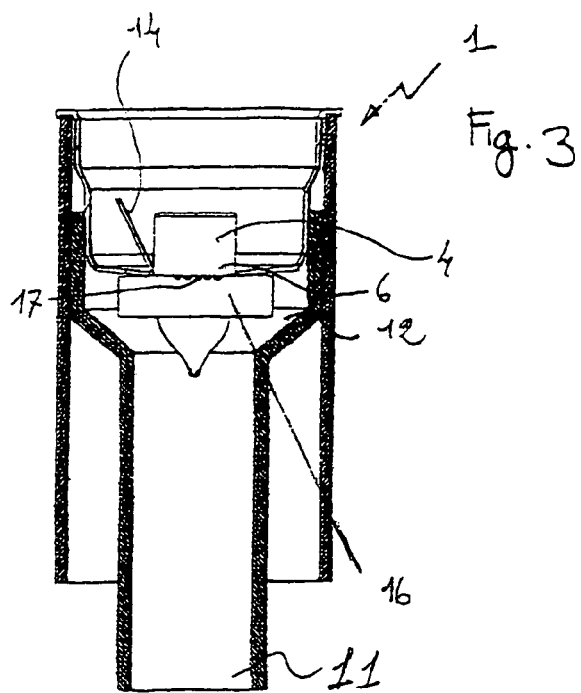
FIG. 3 is a vertical section view of a unit for the preparation of beverages according to another embodiment of the present invention.
Figure 4:
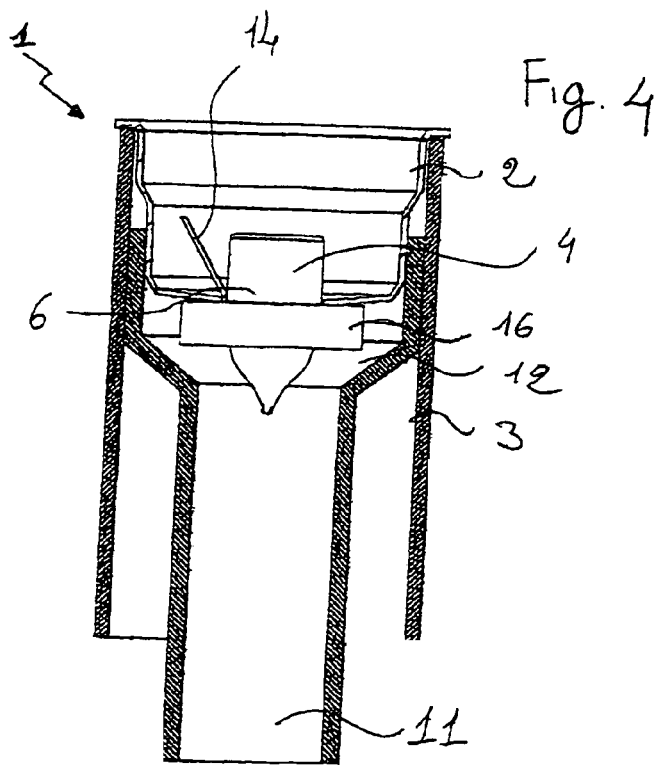
FIG. 4 is a vertical section view of a unit for the preparation of beverages according to a further embodiment of the present invention.
Figure 5:
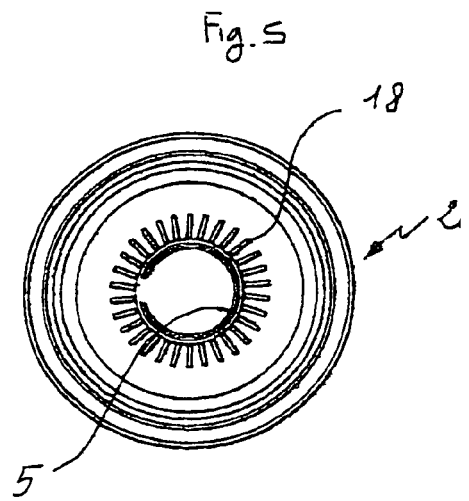
FIG. 5 is a bottom plan view of a cartridge for use in a unit for the preparation of beverages like the one shown in FIG. 4.

FIGS. 3 to 5 show some alternative embodiments of the mixing unit 1 and cartridge 2 according to the present invention.

The embodiments illustrated in FIGS. 3 and 4 feature in particular a supporting element 16 for the cartridge 2.

The supporting element 16 is a ring-shaped element fitted around the piercing member 4 which abuts on the connection fins 12 of the piercing member to support the cartridge 2, limiting deformation of its bottom by the water pressure.

The ring-shaped supporting element 16 thus offers the possibility of creating a throttling arrangement between the supporting surface of the same and the part of the bottom wall that abuts on it.

This embodiment of the throttling arrangement can be used alternatively to or in combination with the one created between the engaging portion 6 and the outlet port of the cartridge 2. If adopted in combination, the effect of the pressure gradient produced between the inside of the cartridge and the outside environment can be further increased, consequently obtaining a high quality product and an even better appearance.

According to another possible embodiment shown in FIG. 3, one or more passages are provided between the supporting element 16 and the cartridge 2, for example, to prevent possible stagnation of product residuals.

In the embodiment shown in FIG. 3, the passages are provided by means of a series of grooves 17 arranged radially on the supporting element 16 corresponding to its interface with the bottom of the cartridge 2, thus ensuring correct evacuation of the beverage from the cartridge even if residuals of product have been left.

Alternatively, as shown in FIG. 5, the passages can be made by means of grooves 18 on the outer surface of the bottom of the cartridge 2, arranged radially around the aperture defined by the notch 5. In this case, the ring-shaped supporting element can be advantageously produced with a smooth interface surface, as for example in the embodiment in FIG. 4, thus permitting the use of cartridges with flat or grooved bottom in the same preparation unit.

According to the characteristics of the different soluble products, cartridges with flat or grooved bottom can be used in the same beverage preparation unit.

FIGS. 6, 7, 8A and 8B show further embodiments of a unit for preparing beverages according to the present invention.

The supporting element 16 shown in FIGS. 6 and 7 features a protruding rib 19, made for example with a cusp-shaped profile on which the bottom wall of the cartridge abuts, thus creating a throttling arrangement which can be adopted as an alternative to or in combination with the one created between the engaging portion 6 and outlet port of the cartridge 2.

The rib 19 is arranged around the piercing member 4 in order to restrict the passage of the beverage as it flows out of the cartridge 2. The pressure created inside the cartridge 2 during delivery guarantees contact between the bottom of the cartridge 2 and the rib 19 for the entire duration of the delivery.

A similar embodiment, adopted in combination with the throttling arrangement between the engaging portion 6 and outlet port of the cartridge 2, achieves laminar flow in both throttling arrangements, thus increasing the already cited effect determined by the pressure gradient between the inside of the cartridge and the outside environment.

As illustrated in FIG. 8A, the rib 19 on the supporting element 16 has a substantially continuous circular shape and surrounds the piercing member 4, thus circumscribing the outlet port of the cartridge 2 once the latter has been inserted on the piercing member 4.

Alternatively, interruptions 20 can be provided as illustrated for example in FIG. 8B, which allow limited passage of the beverage out of the cartridge. This embodiment can be adopted for example in combination with a throttling arrangement already created between outlet port and piercing member.

Various modifications can be made, all falling within the present invention. For example, the rib 19 can be made identically on the cartridge 2 in a position surrounding the outlet port. In this case, the contact surface of the supporting element 16 can be smooth or can also be provided with rib or a seat with shape and dimensions complementary to those of the rib 19 on the cartridge 2.

Furthermore, the number of ribs present on the supporting element 16 and/or on the cartridge 2 can also be varied, likewise other configurations of the rib 19 can be adopted as regards both shapes other than the circular one illustrated in the figures (e.g. elliptical or polygonal) and as regards the section of the rib 19, which can be produced, for example, with flat or rounded end instead of a cusp-shaped end.

The invention claimed is:

1. A combination of a unit for the preparation of a beverage from a soluble product and a disposable cartridge containing said soluble product, said unit including a collecting device with a seat designed to receive said cartridge, said cartridge including at least one inlet port for a suspension fluid introduced into the cartridge and at least one outlet port for delivery of the beverage including said soluble product and said suspension fluid; and at least a throttling arrangement to give said beverage a laminar flow as it is released from the cartridge, wherein:
   said at least one throttling arrangement is formed between said unit and said cartridge,
   said at least one outlet port is defined by at least one breaking line on a bottom wall of said cartridge,
   said collecting device comprises at least one piercing member designed to pierce said cartridge at said breaking line,
   said at least one throttling arrangement includes at least one engaging portion of said piercing member that has a shape and dimensions substantially equal to those of said outlet port, and
   the piercing member has a height that allows an upper end of the piercing member to exert a pressure on the breaking line upon insertion of the cartridge in the seal of the collecting device.

2. A combination according to claim 1, wherein said engaging portion of said piercing member has a substantially cylindrical shape with circular section and wherein said breaking line in said cartridge has a substantially circular shape.

3. A combination according to claim 1, wherein said engaging portion of said piercing member has a diameter substantially equal to or slightly larger than that of said outlet port to form an interference fit between the outlet port of said cartridge and said piercing member.

4. A combination according to claim 1, wherein said collecting device comprises means for supporting said cartridge fitted in said seat.

5. A combination according to claim 4, wherein said supporting means comprise a supporting element provided with a surface designed to support at least part of the bottom wall of said cartridge.

6. A combination according to claim 5, wherein one or more passages are arranged between said supporting surface of said supporting element and the outer wall of said cartridge comprising said outlet port.

7. A combination according to claim 6, wherein said supporting element has a ring shape and wherein said passages are formed by a number of grooves arranged radially on the supporting surface of said supporting element.

8. A combination according to claim 6, wherein said passages are formed by a number of grooves arranged radially at least on the outer surface of the wall of said cartridge comprising said outlet port.

9. A combination according to claim 1, comprising at least one supporting element provided with a surface designed to support at least part of the wall of said cartridge which includes said outlet port, wherein said at least one throttling arrangement includes at least one rib protruding from the supporting surface of said supporting element and designed to abut against the wall of said cartridge comprising said outlet port and surround said outlet port.

10. A combination according to claim 1, comprising at least one supporting element provided with a surface designed to support at least part of the wall of said cartridge which includes said outlet port, wherein said at least one throttling arrangement includes at least one protruding rib which surrounds said outlet port in said cartridge, said rib being designed to abut against the supporting surface off said supporting element.

11. A combination according to claim 9, wherein said at least one protruding rib is continuous.

12. A combination according to claim 9, wherein said at least one protruding rib comprises one or more interruptions.

13. A combination according to claim 1, comprising at least one supporting element, provided with a surface designed to support at least part of the wall of said cartridge which includes said outlet port, wherein said at least one throttling arrangement includes the supporting surface of said supporting element and at least part of the wall of said cartridge comprising said outlet port.

14. A method for the preparation of a beverage from a soluble product contained in a disposable cartridge, the method comprising:
fitting said cartridge in a preparation unit having a seat for said cartridge and a collecting device for said beverage,
conveying a suspension fluid into said cartridge via an inlet port,
delivering a beverage including said soluble product and said suspension fluid via an outlet port of said cartridge,
throttling the beverage to give said beverage a laminar flow as it is released from the cartridge,
creating said throttling by interaction between said unit and said cartridge,
providing said outlet port with at least one breaking line on a wall of said cartridge,
providing said collecting device with at least one piercing member designed to pierce said cartridge at said breaking line, and
dimensioning the piercing member to have a height sufficient to exert pressure on the breaking line upon insertion of the cartridge in the seat of the collecting device.

15. A method according to claim 14, wherein said outlet port has a shape and dimensions substantially equal to those of said engaging portion.

16. A method according to claim 14, wherein said throttling is created between at least one rib protruding from the supporting surface of a supporting element of the cartridge present in said collecting device and the outer bottom wall of said cartridge, said at least one rib being designed to abut against the outer bottom wall comprising said outlet port of said cartridge and to surround said outlet port.

17. A method according to claim 14, wherein said throttling is created between at least one protruding rib which surrounds said outlet port in said cartridge and the supporting surface of a supporting element of said cartridge, said rib being designed to abut against the supporting surface of said supporting element present in said collecting device.

18. A method according to claim 14, wherein said throttling is created between the supporting surface of a supporting element of said cartridge present in said collecting device and at least part of the outer bottom wall of said cartridge comprising said outlet port.

* * * * *